US011709665B2

(12) United States Patent
Scrivano

(10) Patent No.: US 11,709,665 B2
(45) Date of Patent: Jul. 25, 2023

(54) HYBRID APPROACH TO PERFORMING A LAZY PULL OF CONTAINER IMAGES

(71) Applicant: Red Hat, Inc., Raleigh, NC (US)

(72) Inventor: Giuseppe Scrivano, Milan (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/220,850

(22) Filed: Apr. 1, 2021

(65) Prior Publication Data

US 2022/0317987 A1 Oct. 6, 2022

(51) Int. Cl.
*G06F 8/61* (2018.01)
*G06F 16/18* (2019.01)

(52) U.S. Cl.
CPC ............ *G06F 8/63* (2013.01); *G06F 16/1865* (2019.01)

(58) Field of Classification Search
CPC .............................. G06F 8/63; G06F 16/1865
See application file for complete search history.

(56) References Cited

U.S. PATENT DOCUMENTS

| | | | |
|---|---|---|---|
| 9,766,915 B1* | 9/2017 | Emelyanov | G06F 9/455 |
| 10,055,219 B1* | 8/2018 | Olderdissen | H04L 67/34 |
| 10,430,378 B1* | 10/2019 | Harter | G06F 16/16 |
| 10,606,646 B1* | 3/2020 | Christensen | G06F 9/5016 |
| 10,659,533 B1* | 5/2020 | Zhao | G06F 12/0862 |
| 10,768,961 B2 | 9/2020 | Bradshaw et al. | |
| 10,860,536 B2 | 12/2020 | Jobi et al. | |
| 2012/0179730 A1* | 7/2012 | Siegers | G06F 16/1865 707/822 |
| 2016/0072888 A1* | 3/2016 | Jung | H04L 67/01 709/219 |
| 2018/0143882 A1* | 5/2018 | Dodge | G06F 16/1865 |
| 2019/0347121 A1 | 11/2019 | Luo et al. | |
| 2019/0354382 A1* | 11/2019 | Ross | G06F 9/44505 |

(Continued)

FOREIGN PATENT DOCUMENTS

| | | |
|---|---|---|
| CN | 107454188 A | 12/2017 |
| CN | 109005232 A | 12/2018 |

(Continued)

OTHER PUBLICATIONS

Thalheim et al., "CNTR: Lightweight OS Containers", Jul. 2018, USENIX (Year: 2018).*

(Continued)

*Primary Examiner* — Wei Y Zhen
*Assistant Examiner* — Junchun Wu
(74) *Attorney, Agent, or Firm* — Womble Bond Dickinson (US) LLP

(57) ABSTRACT

Embodiments of the present disclosure provide a hybrid approach to performing a lazy pull of a container image. A file system in user space (FUSE) is utilized to lazy pull the container image, and manage file requests from the container while the container image is being fetched locally. During the retrieving, the FUSE may receive from the container, one or more file requests, and may temporarily block each of the one or more file requests until it can process them. Once the container image is fully fetched locally, the overlay structure of the container image expected by a file system in the kernel (e.g., Overlay FS) is created and control is passed to the file system in the kernel. The FUSE may then unmount itself, to expose the container to the underlying mount point.

17 Claims, 7 Drawing Sheets

(56) References Cited

U.S. PATENT DOCUMENTS

| | | | | |
|---|---|---|---|---|
| 2019/0384495 | A1* | 12/2019 | Balcha | G06F 3/0619 |
| 2020/0004977 | A1* | 1/2020 | Araujo | G06F 16/185 |
| 2020/0012511 | A1* | 1/2020 | Ganesh | G06F 9/44526 |
| 2020/0082094 | A1* | 3/2020 | Mcallister | G06F 8/77 |
| 2021/0311759 | A1* | 10/2021 | Corrie | G06F 8/63 |
| 2022/0114037 | A1* | 4/2022 | Jobi | G06F 9/455 |
| 2022/0171648 | A1* | 6/2022 | Rodriguez | G06F 9/5072 |

FOREIGN PATENT DOCUMENTS

| | | | | | |
|---|---|---|---|---|---|
| CN | 111813742 | A | * | 10/2020 | G06F 16/13 |
| CN | 112019643 | A | | 12/2020 | |
| EP | 3977274 | A1 | * | 4/2022 | G06F 8/63 |
| WO | WO-2010131023 | A1 | * | 11/2010 | G06F 17/30212 |
| WO | 2020232713 | A1 | | 11/2020 | |

OTHER PUBLICATIONS

Ma et al., "Efficient Service Handoff Across Edge Servers via Docker Container Migration", 2017, ACM (Year: 2017).*

Chazapis et al., "Global-scale peer-to-peer file services with DFS", 2007, IEEE (Year: 2007).*

Berzanoet al., "Lightweight scheduling of elastic analysis containers in a competitive cloud environment: a Docked Analysis Facility for ALICE", 2015, IOP Publishing Ltd (Year: 2015).*

\* cited by examiner

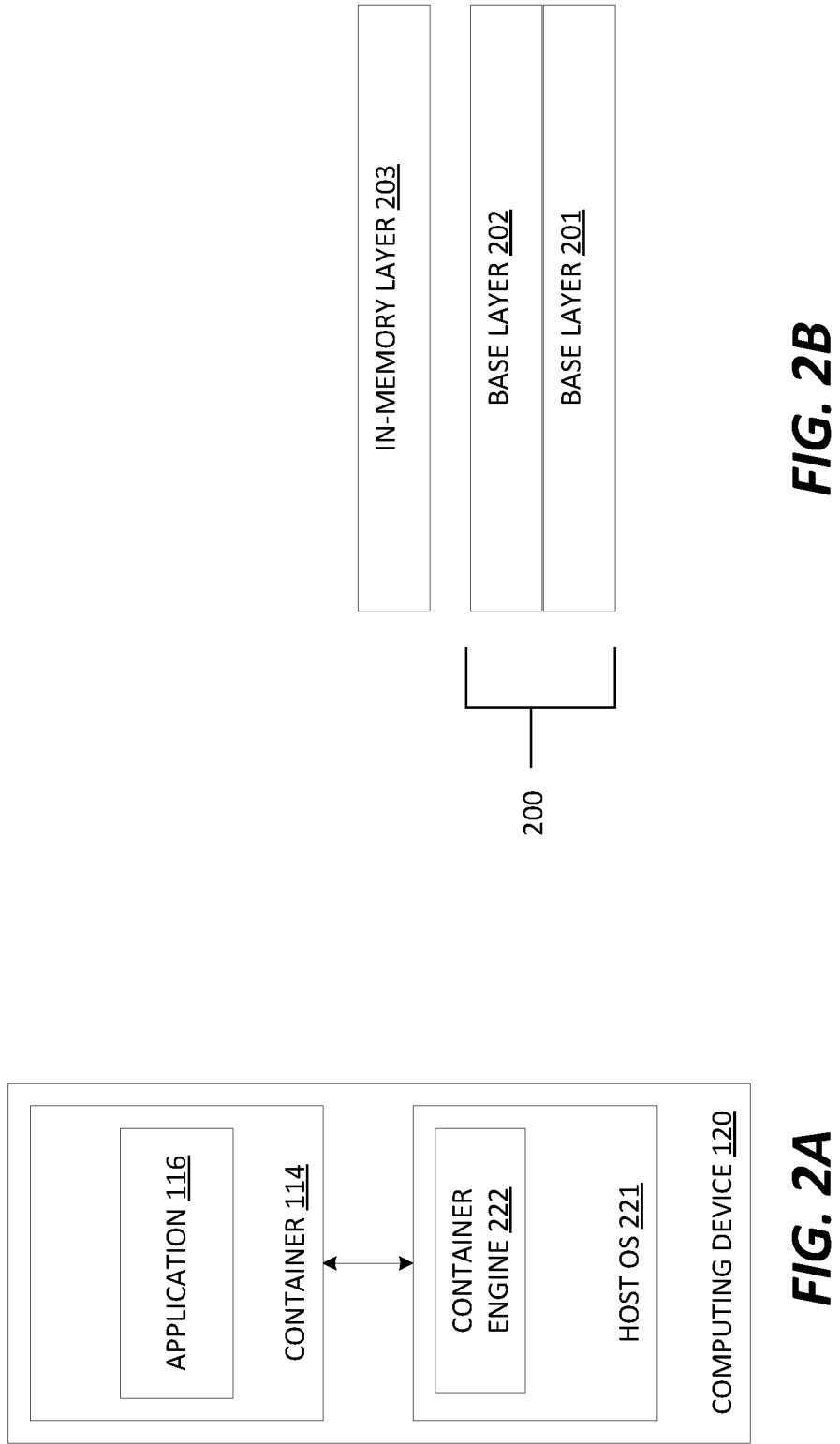

HYBRID APPROACH TO PERFORMING A LAZY PULL OF CONTAINER IMAGES

TECHNICAL FIELD

Aspects of the present disclosure relate to containers, and more particularly, to instantiating containers by performing a lazy pull of a container image.

BACKGROUND

Containers are active components executing on an operating system that provide an environment for applications to run, while being isolated from any other components of a host machine, network, or data center etc. Multiple containers may execute on a single operating system kernel and share the resources of the hardware the operating system is running on. All of the files, libraries and dependencies necessary to run applications in a container may be provided by a container image(s). A container image may be comprised of a set of base layers that define the runtime environment, as well as the packages and utilities necessary for a containerized application to run. A container may include the base layers from a container image as well as an in-memory layer in which the containerized application may write/modify data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2A is a block diagram that illustrates an example container executing within a computing device, in accordance with some embodiments of the present disclosure.

FIG. 2B is a block diagram that illustrates a container image and the in-memory layer of a container, in accordance with some embodiments of the present disclosure.

DETAILED DESCRIPTION

Figure 1:
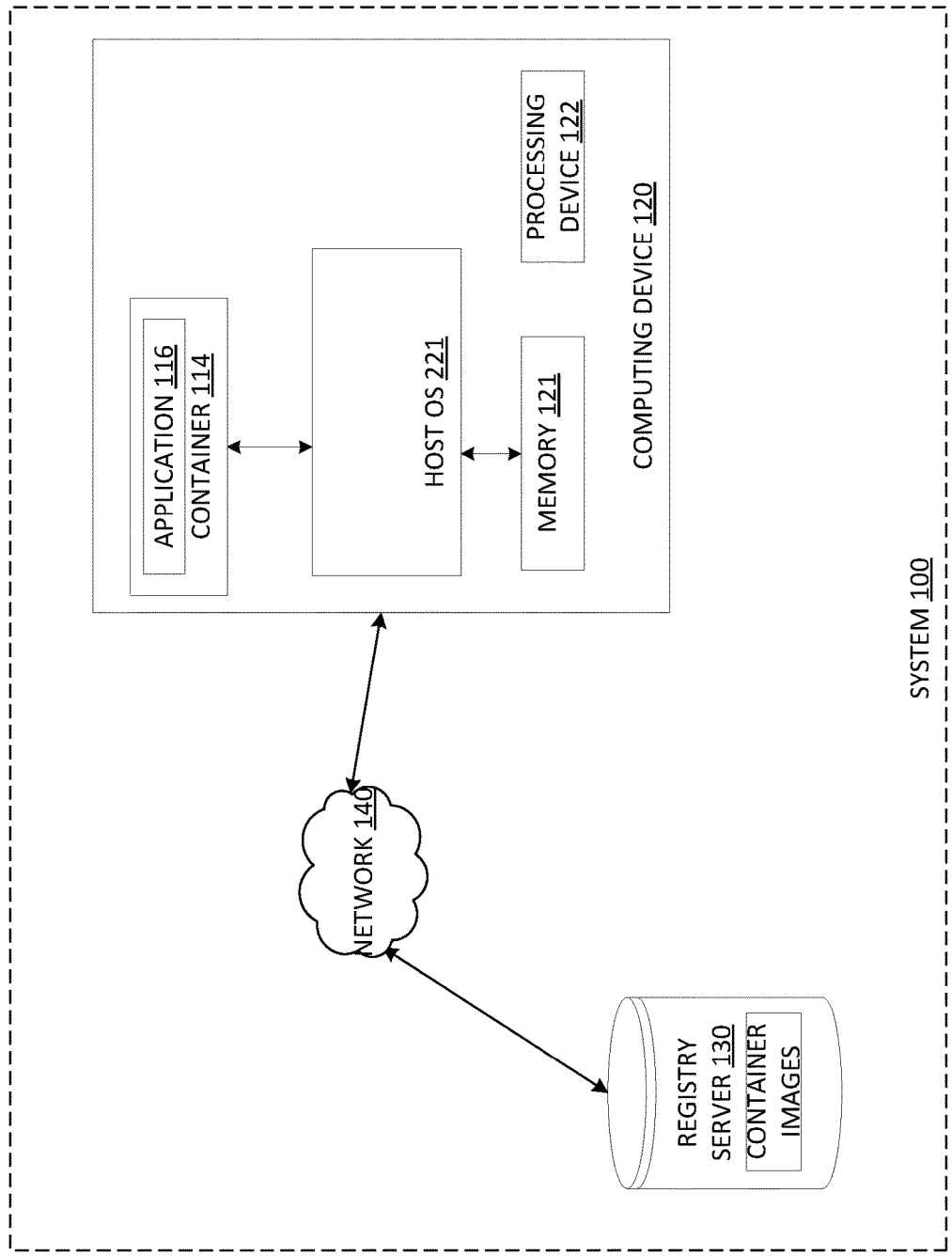
FIG. 1 is a block diagram that illustrates an example system, in accordance with some embodiments of the present disclosure.

A container image must be fetched (e.g., from a registry server) and stored locally in e.g., a container engine before a container can be created based on it. A file system in user space (FUSE) allows for a container to be started before the underlying image is fully fetched locally. The FUSE will intercept any request from the container to access files of the container image and/or open/write files, and fetch the requested files/open the requested files on demand. Until the file is fetched from the remote registry server, the request will be blocked by the FUSE. Normally, the higher level logic of a file system is implemented in the kernel, which allows for speed and efficient use of system resources. However, all of the higher level logic (e.g., primitives for interacting with the registry server, authentication etc.) of the FUSE is implemented in user space.

File systems implemented in user space are slower and require additional resources compared to file systems implemented in the kernel. This is because each request from the requesting process must still go through the kernel, which sends the request to the process running the FUSE. The process running the FUSE then sends the requested file(s) back to the kernel, which sends the request back to the requesting process. The extra step of sending the request to the process running the FUSE and receiving a reply back at the kernel requires additional time and resources. Because of this, for container images that are retrieved on demand using the lazy pull technique, there is a cost in resources even after the container image is fully fetched locally because all file requests must continue to go through the FUSE.

The present disclosure addresses the above-noted and other deficiencies by using a hybrid approach, wherein the FUSE is utilized to lazy pull the container image, and manages file requests while the container image is being fetched locally. Once the container image is fully fetched locally, the overlay structure of the container image expected by a file system in the kernel (e.g., Overlay FS) is created and control is passed to the file system in the kernel. In some embodiments, a processing device is used to retrieve, by a file system in user space (FUSE), a plurality of files corresponding to a container image. The FUSE may be mounted on a FUSE mount point that overlays an empty mount point (i.e., has no directories). The FUSE mount point and the empty mount point may be combined into a single mount point by an Overlay file system (Overlay FS). The plurality of files may be used by the FUSE to build, in the empty mount point, one or more base layers for running a container. During the retrieving, the FUSE may receive from the container, one or more file requests, and may temporarily block each of the one or more file requests until it can process them. Stated differently, the FUSE may act as a proxy between the container and the container image. In response to determining that all of the plurality of files have been retrieved or requested, the FUSE may process any outstanding file requests and instruct the mount point to run the container using the one or more base layers created. The FUSE may then unmount itself, to thereby expose the container to the underlying mount point.

FIG. 1 is a block diagram that illustrates an example system 100. As illustrated in FIG. 1, the system 100 includes a computing device 120, a registry server 130 and a network 140. The computing device 120 and the registry server 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi' hotspot connected with the network 140 and/or a wireless carrier system that can be implemented using various data processing equipment, communication towers (e.g. cell towers), etc. The network 140 may carry communications (e.g., data, message, packets, frames, etc.) between computing device 120 and registry server 130. The computing device 120 (and registry server 130) may include hardware such as processing device 122 (e.g., processors, central processing units (CPUs)), memory 121 (e.g., random access memory (RAM), storage devices (e.g., hard-disk drive (HDD)), and solid-state drives (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The computing device 120 and registry server 130 may comprise any suitable type of computing device or machine that has a programmable processor including, for example, server computers, desktop computers, laptop computers, tablet computers, smartphones, set-top boxes, etc. In some examples, the computing device 120 and registry server 130 may comprise a single machine or may include multiple interconnected machines (e.g., multiple servers configured in a cluster). The computing device 120 and registry server 130 may be implemented by a common entity/organization or may be implemented by different entities/organizations. For example, computing device 120 may be operated by a first company/corporation and registry server 130 may be operated by a second company/corporation. The computing device 120 and registry server 130 may each execute or include an operating system (OS), as discussed in more detail below. The OSs of computing device 120 and registry server 130 may manage the execution of other components (e.g., software, applications, etc.) and/or may manage access to the hardware (e.g., processors, memory, storage devices etc.) of the computing device.

As illustrated in FIG. 1, computing device 120 may run a container 114. In some embodiments, the container 114 may execute on a container engine (shown in FIG. 2A) which may execute on top of the host OS 221 of computing device 120, as discussed in more detail below. The container engine may allow different containers to share the host OS 221 (e.g., the OS kernel, packages, binaries, libraries thereof etc.), and may also perform other functions as discussed in more detail below. The container 114 may be isolated, in that it is not connected to any other device or component of system 100, whether virtual or otherwise. Container 114 may execute application 116. Registry server 130 may be a server which may store container images (e.g., docker images), as discussed in further detail herein. Although FIG. 1 illustrates only a single computing device 120 for ease of illustration and description, computing device 120 may be just one deployment among many within an overarching cloud or on-premises infrastructure that system 100 represents. For example, additional computing devices may be included within system 100 that act as additional deployments.

FIG. 2A is a block diagram that illustrates the container 114 of FIG. 1 executing within computing device 120, in accordance with some embodiments of the present disclosure. In one embodiment, the container 114 may be an isolated set of resources allocated to executing an application, software, and/or process independent from other applications, software, and/or processes. The host OS 221 may use namespaces to isolate the resources of containers from each other. In another embodiment, the container 114 may be a virtualized object similar to a virtual machine. However, the container 114 may not implement a separate guest OS. The container 114 may share the OS kernel and packages (e.g., libraries, binary files and source files) of the host OS 221 with other containers (not shown) that are executing on the computing device 120. Although FIG. 2A illustrates one container 114, the computing device 120 may include multiple containers in other embodiments. Each container may have one or more respective file systems, memories, devices, network ports, etc., for accessing the physical resources of the computing device 120 (e.g., processing device 122 and memory 121, shown in FIG. 1).

In some embodiments, the container engine 222 may allow different containers to share the host OS 221 (including e.g., the OS kernel as well as packages including any associated libraries, binary and/or source files etc.) of the computing device 120. For example, the container engine 222 may multiplex the packages of the host OS 221 between multiple containers. The container engine 222 may also facilitate interactions between the container 114 and the resources of the computing device 120. For example, the container engine 222 may manage requests from container 114 to access a memory (e.g., a RAM) of the computing device 120. In another example, the container engine 222 may manage requests from the container 114 to access certain packages of the host OS 221. The container engine 222 may also create, remove, and manage containers. In one embodiment, the container engine 222 may be a component of the host operating system 221 (e.g., Red Hat Enterprise Linux). In another embodiment, container engine 222 may run on top of the host OS 221, or may run directly on host hardware without the use of the host OS 221. In yet other embodiments, container engine 222 may be a component of a network virtualization platform (not shown), such as the RedHat™ OpenStack™ platform for example, that runs on host OS 211. Container engine 222 may include software or logic to build a container using a container image such as a docker file.

As illustrated in FIG. 2A, application 116 may execute within the container 114. For example, the application 116 may execute within a runtime environment (not shown in the figures) of the container 114. Both the container 114 and the application 116 may be created by the host OS 221 (e.g., via container engine 222). The host OS 221, via the computing device 120 may provide administrators and users with the capability to configure and deploy a variety of applications and/or network functions within containers.

Container engine 222 may provide an image-based deployment module for creating containers and may store one or more container images (referred to herein as "container images") for creating container instances. In some embodiments, the container images may be stored in registry server 130 (e.g., after being generated by a developer or vendor). Each container image may include a series of layers, which may be combined into a single image as discussed in further detail herein.

The host OS 221 may allow file systems on different partitions and removable devices (CDs, DVDs, or USB flash drives for example) to be attached to a certain point (a mount point) in the directory tree, and then detached again. Container engine 222 may include a file system such as the Overlay file system (referred to in FIG. 3A as Overlay FS 222A), which may combine multiple different underlying mount points into a single mount point, resulting in a single directory structure that contains underlying files and sub-directories from various sources. For example, Overlay FS 222A may generate a container by allowing a read-write (e.g. in-memory) layer to be overlaid on top of one or more read-only layers (e.g., the one or more base layers of a container image). Changes (e.g., data to be written) made by the container (or a process thereof) may be recorded in the upper-most layer (e.g., the in-memory layer), while the lower layer(s) (e.g., base layers) remain unmodified. In this way, multiple containers may share a container image that includes base layers that are read-only. The higher level logic of the overlay FS 222A may be implemented in the kernel.

FIG. 2B illustrates an example container image 200 that the container 114 may be generated from using the overlay FS 222A. The container image 200 may be stored by the container engine 222 illustrated in FIG. 2A or registry server 130 illustrated in FIG. 1. In some embodiments, as illustrated in FIG. 2B, container image 200 may include base layers 201 and 202. Container image 200 may be shared by multiple containers. When the container engine 222 (via Overlay FS 222A) creates a new container, it may add a new writable (e.g., in-memory) layer on top of the underlying base layers 201 and 202. This new writable layer is illustrated as the in-memory layer 203 in FIG. 2B. When the container is deleted, the in-memory layer 203 is also deleted. However, the underlying container image 200 remains unchanged. Although illustrated as having two base layers for simplicity, container image 200 may include any suitable number of base layers. Base layers may define the runtime environment as well as the packages and utilities necessary for a containerized application to run. In the example of FIG. 2B, base layer 201 may comprise the host OS 221 (including e.g., the OS kernel as well as the packages of the host OS 221 including any associated libraries, binary and/or source files etc.), on which the application 116 may run. The base layer 202 may comprise the application itself including any packages and utilities necessary for the application 116 to run. Thus, base layers 201 and 202 may each comprise static snapshots of the container 114's configuration and may be read-only layers that are never modified. Any changes (e.g., data to be written by the application 116) may be implemented in subsequent (upper) layers such as in-memory layer 203. Changes made in the in-memory layer 203 may be saved by creating a new layered image.

The container engine 222 may further comprise a file system in user space (FUSE) whose higher level logic may be implemented in user-space and may allow non-privileged users to create their own file systems without editing the code of the kernel. This is achieved by running the file system code in user space while a FUSE module provides a "bridge" to the actual kernel interfaces. The FUSE may allow the container engine 222 to perform a "lazy image pull" where a container is created before a container image the container is to be based on is locally available (e.g., stored within the overlay FS 222A). The container image is loaded on demand when the container wants to access the container image. As discussed, traditional methods of performing a lazy image pull require the FUSE to exist for the lifetime of the container, even after the container image is fully fetched locally.

Figure 3A:
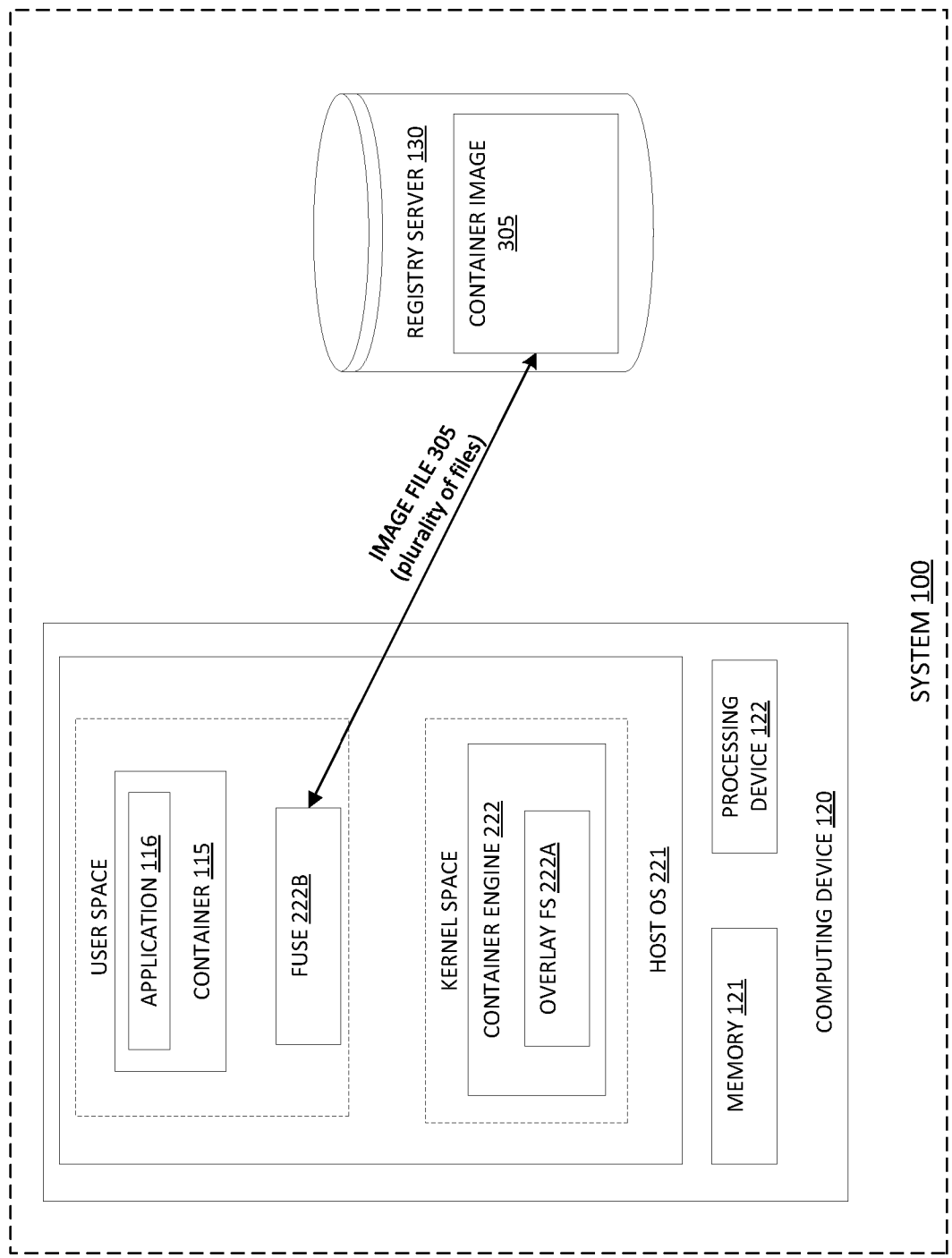
FIG. 3A is a block diagram that illustrates an example system, in accordance with some embodiments of the present disclosure.
Figure 3B:
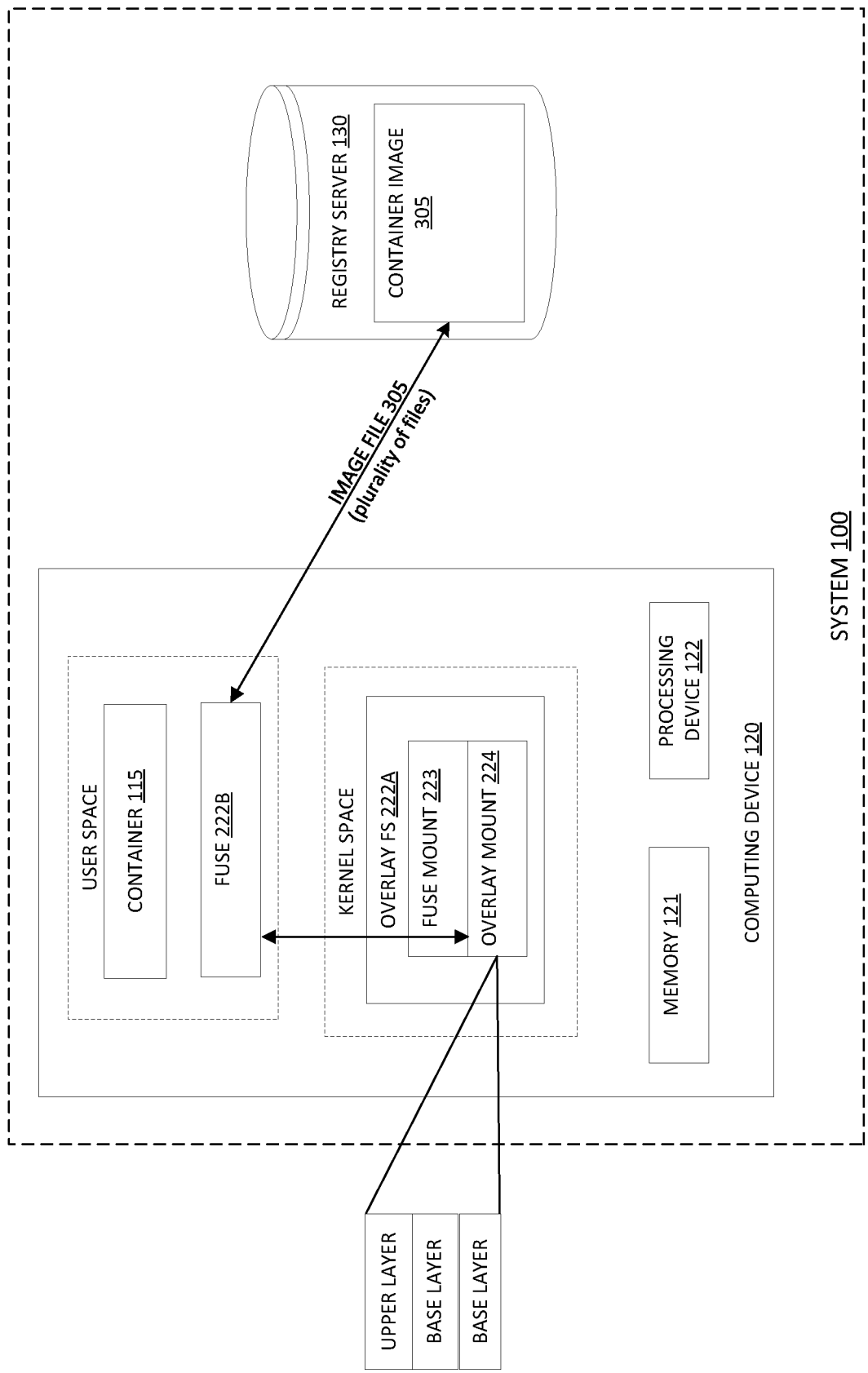
FIG. 3B is a block diagram that illustrates an example system, in accordance with some embodiments of the present disclosure.

FIGS. 3A and 3B illustrate the system 100 in accordance with some embodiments of the present disclosure. In response to a request to create a container by "lazy pulling" container image 305, the container engine 222 (via the overlay FS 222A) may create a container process (illustrated as container 115) and an empty overlay mount point (e.g., having empty directories, or layers), hereinafter referred to as and shown in FIG. 3B as "overlay mount 224." More specifically, the overlay mount 224 may have a container file system with a number of empty layers (not shown) mounted to it, the empty layers may include one or more lower layers within which base layers of the container image 305 may be built as well as an upper (write) layer. On top of the overlay mount 224, the container engine 222 (via the overlay FS 222A) may create (overlay) a FUSE mount point (hereinafter referred to as and shown in FIG. 3B as "FUSE mount 223") where a FUSE (illustrated as FUSE 222B) may be mounted. It should be noted that the overlay FS 222A may combine the FUSE mount 223 and the overlay mount 224 into a single mount point as discussed hereinabove. The higher level logic of the FUSE 222B may be implemented in user-space.

The FUSE 222B may begin fetching the files that the container image 305 is comprised of from the registry server 130 as a background process in order to build (the base layers of) the container image 305 locally (e.g., within the currently empty lower layers of the overlay mount 224). This is desirable as the higher level logic for retrieving container images is ideally located in user-space. While fetching the container image 305, the FUSE 222B may also act as a proxy between the container 115 and the underlying container image 305. In this way, while the container image 305 is not fully built locally, the FUSE 222B may manage requests from the container 115 to access files. To handle pending file requests, in some embodiments, the FUSE 222B may emulate the overlay mount 224 so if the container 115 wishes to write a file, the FUSE 222B may write the file in the upper (write) layer at the appropriate location, or it may attempt to write to the overlay mount 224 through the overlay FS 222A.

More specifically, upon receiving a request from the container 115 to access a file, the FUSE 222B may determine whether the requested file is one of the files that the container image 305 is comprised of, and if so may determine whether the requested file has already been fetched from the registry server 130 and locally stored. If the FUSE 222B determines that the requested file is part of the container image 305 and has been locally stored, then it may retrieve the file from the overlay mount 224 and provide it to the container 115. If the FUSE 222B determines that the requested file is part of the container image 305 and that it has not been locally stored, it may fetch the requested file from the registry server 130 and store it in the overlay mount 224 (e.g., within the appropriate base layer being constructed in the overlay mount 224). Once the requested file(s) has been written to the overlay mount 224, the FUSE 222B may provide it to the container 115. If the FUSE 222B determines that the requested file is not part of the container image 305, the FUSE 222B may determine that the container wants to create a new file. Thus, the FUSE 222B may create an empty file in the upper (write) layer of the overlay mount 224. While there are no active requests for files from the container 115, the FUSE 222B may continue fetching the files that the container image 305 is comprised of and storing them locally to build the base layers for the container image 305 within the overlay mount 224.

Once the FUSE 222B determines that all of the files that the container image 305 is comprised of have been retrieved or requested, it may process any pending file requests as described above, thereby resulting in the entire container image 305 being locally stored. At this point, the base layers of container image 305 (i.e., a set of underlying directories corresponding to the container image 305) may be built in the overlay mount 224 and the FUSE 222B may instruct the overlay mount 224 to use the underlying base layers to run the container 115. At the same time, the FUSE 222B may unmount itself (i.e., detach itself from the file system view), so that the container 115 may be exposed to the underlying overlay mount 224 which now comprises the complete base layers of the container image 305.

More specifically, the FUSE 222B may bind-mount on top of itself, the underlying overlay FS 222A. The FUSE 222B may fork a new process (not shown) which may join the container mount namespace. The new process may move or bind-mount every mount point that exists on top of the FUSE mount 223 (i.e., the current root file system of the container 115) (e.g., sysfs for/sys, procfs for/proc, and every volume bind mount) under the overlay mount 224 (e.g., if the overlay mount 224 is mounted at rootfs/tmp/underlying-overlay, then/sys from the FUSE mount 223 is moved to/tmp/underlying-overlay/sys, and so on for each additional mount that exists on the FUSE mount 223). The overlay mount 224 itself, which also exists on top of the FUSE mount 223, is not moved. The new process may use a system call (e.g., syscall pivot_root(2)) to switch to the overlay mount 224, at which point the overlay mount 224 may become the root file system of the container 115 (i.e., for the entire container mount namespace). The FUSE 222B may continue working in the background as a proxy for the overlay mount 224 until the plurality of files corresponding to the container image 305 are referenced by processes in the container 115. Once there are no more files referenced in the FUSE 222B, the FUSE mount 223 is unmounted and the FUSE 222B terminates.

Figure 4:
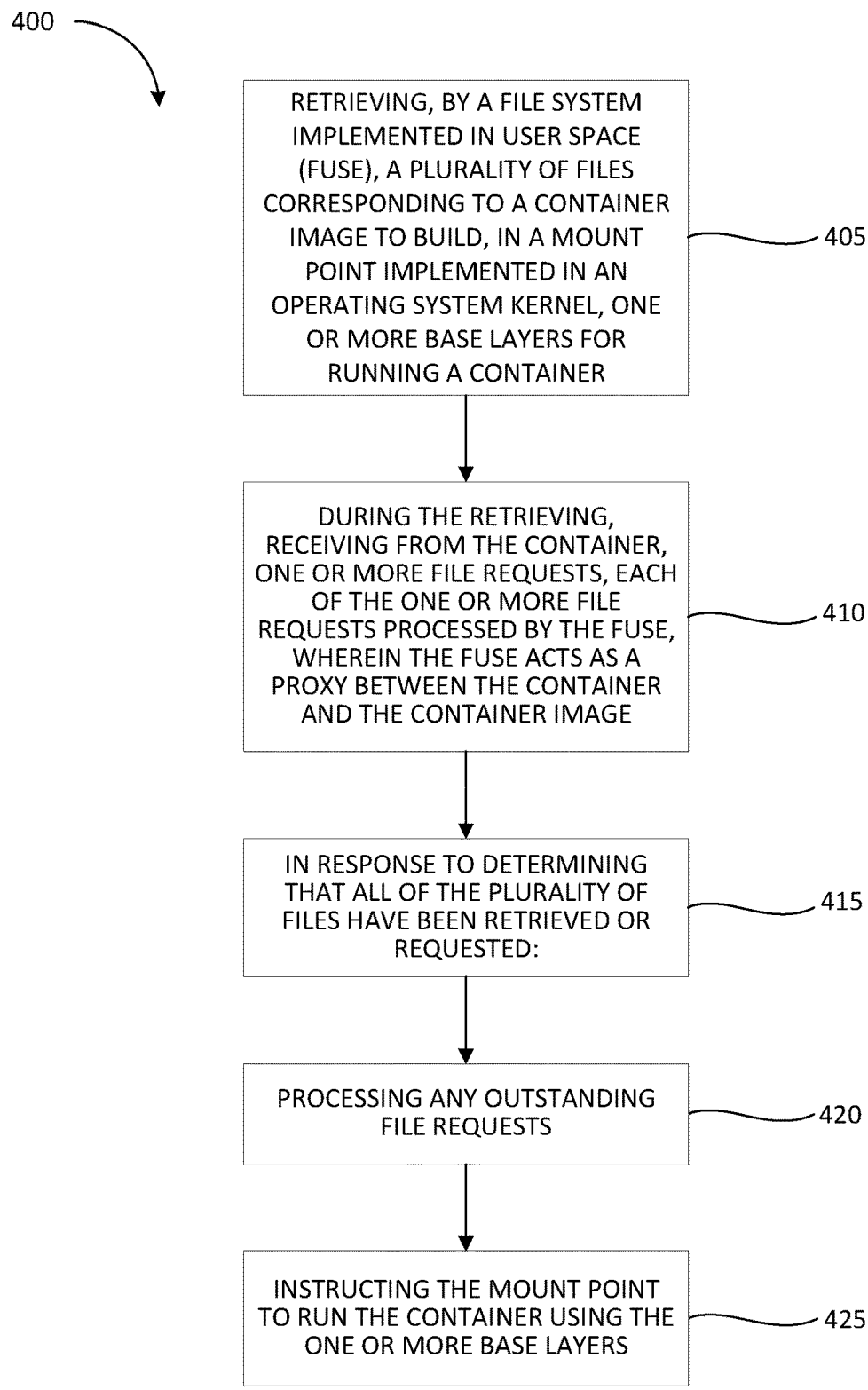
FIG. 4 is a flow diagram of a method of lazy pulling a container image, in accordance with some embodiments of the present disclosure.

FIG. 4 is a flow diagram of a method 400 for performing a "lazy pull" of a container image, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120 illustrated in FIGS. 1 and 2A).

Referring simultaneously to FIGS. 3A and 3B as well, the method 400 begins at block 405, where the FUSE 222B may retrieve a plurality of files corresponding to a container image to build, in a mount point implemented in an operating system kernel, one or more base layers for running a container. The FUSE 222B may begin fetching the files that the container image 305 is comprised of from the registry server 130 as a background process in order to build (the base layers of) the container image 305 locally (e.g., within the currently empty lower layers of the overlay mount 224). This is desirable as the higher level logic for retrieving container images is ideally located in user-space. While fetching the container image 305, the FUSE 222B may also act as a proxy between the container 115 and the underlying container image 305. In this way, at block 410, while the container image 305 is not fully built locally, the FUSE 222B may manage requests from the container 115 to access files. To handle pending file requests, in some embodiments, the FUSE 222B may emulate the overlay mount 224 so if the container 115 wishes to write a file, the FUSE 222B may write the file in the upper (write) layer at the appropriate location, or it may attempt to write to the overlay mount 224 through the overlay FS 222A.

Figure 5:
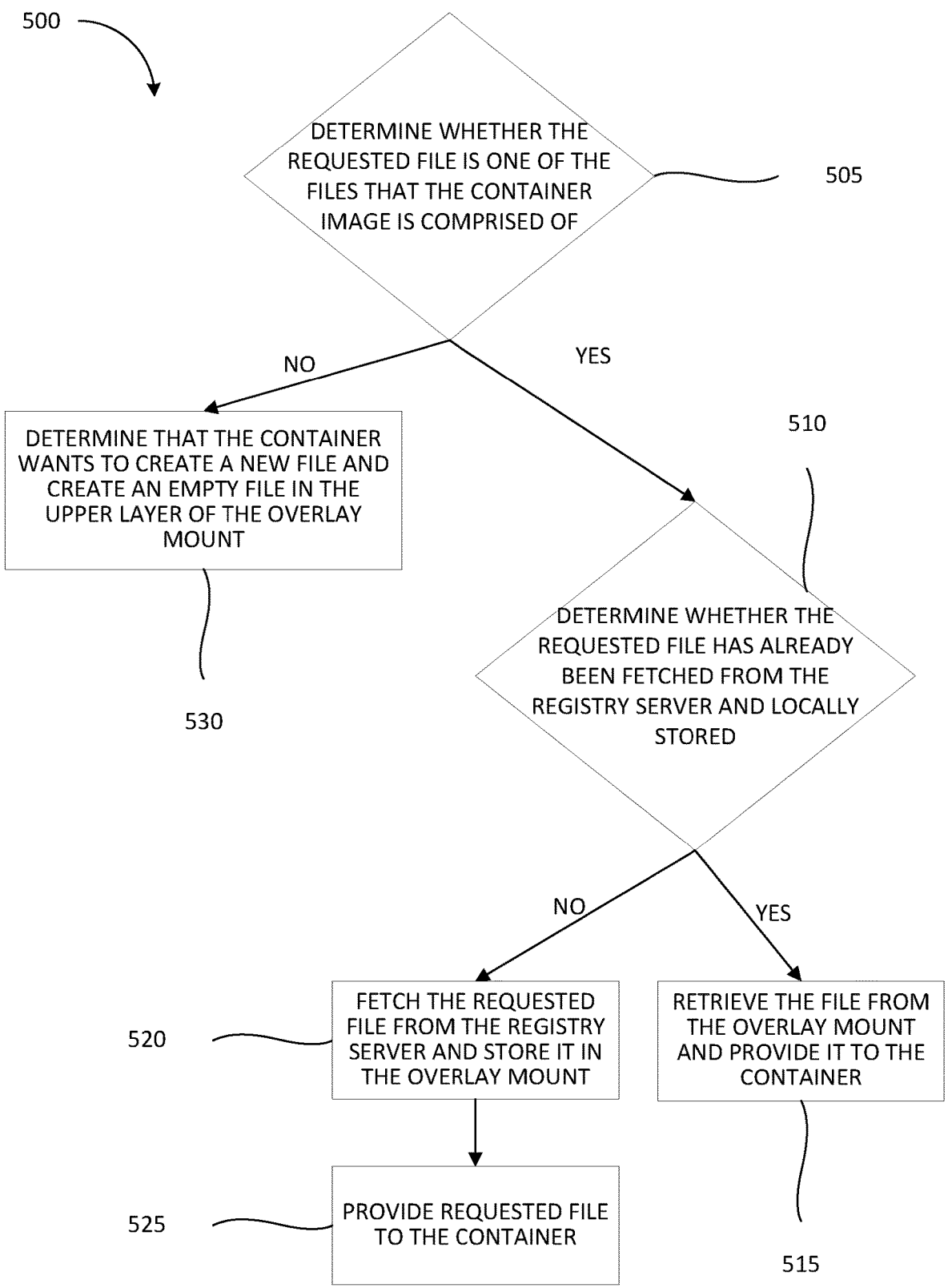
FIG. 5 is a flow diagram of a method of processing a file request by a container while retrieving a container image, in accordance with some embodiments of the present disclosure.

FIG. 5 is a flow diagram of a method 500 of processing a file request by a container while retrieving a container image, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 120 illustrated in FIGS. 1 and 2A).

At block 505, upon receiving a request from the container 115 to access a file, the FUSE 222B may determine whether the requested file is one of the files that the container image 305 is comprised of, and if so, at block 510 may determine whether the requested file has already been fetched from the registry server 130 and locally stored. If the FUSE 222B determines that the requested file is part of the container image 305 and has been locally stored, then at block 515 it may retrieve the file from the overlay mount 224 and provide it to the container 115. If at block 510 the FUSE 222B determines that the requested file has not been locally stored, then at block 520 it may fetch the requested file from the registry server 130 and store it in the overlay mount 224 (e.g., within the appropriate base layer being constructed in the overlay mount 224). Once the requested file(s) has been written to the overlay mount 224, at block 525 the FUSE 222B may provide it to the container 115. If at block 505, the FUSE 222B determines that the requested file is not part of the container image 305, at block 530 the FUSE 222B may determine that the container wants to create a new file. Thus, the FUSE 222B may create an empty file in the upper (write) layer of the overlay mount 224. While there are no active requests for files from the container 115, the FUSE 222B may continue fetching the files that the container image 305 is comprised of and storing them locally to build the base layers for the container image 305 within the overlay mount 224.

Referring back to FIG. 4, at block 415, once the FUSE 222B determines that all of the files that the container image 305 is comprised of have been retrieved or requested, it may process any pending file requests as described above at block 420, thereby resulting in the entire container image 305 being locally stored. At this point, the base layers of container image 305 (i.e., a set of underlying directories corresponding to the container image 305) may be built in the overlay mount 224 and at block 425, the FUSE 222B may instruct the overlay mount 224 to use the underlying base layers to run the container 115. At the same time, the FUSE 222B may unmount itself (i.e., detach itself from the file system view), so that the container 115 may be exposed to the underlying overlay mount 224 which now comprises the complete base layers of the container image 305.

More specifically, the FUSE 222B may bind-mount on top of itself, the underlying overlay FS 222A. The FUSE 222B may fork a new process (not shown) which may join the container mount namespace. The new process may move or bind-mount every mount point that exists on top of the FUSE mount 223 (i.e., the current root file system of the container 115) (e.g., sysfs for/sys, procfs for/proc, and every volume bind mount) under the overlay mount 224 (e.g., if the overlay mount 224 is mounted at rootfs/tmp/underlying-overlay, then/sys from the FUSE mount 223 is moved to/tmp/underlying-overlay/sys, and so on for each additional mount that exists on the FUSE mount 223). The overlay mount 224 itself, which also exists on top of the FUSE mount 223, is not moved. The new process may use a system call (e.g., syscall pivot_root(2)) to switch to the overlay mount 224, at which point the overlay mount 224 may become the root file system of the container 115 (i.e., for the entire container mount namespace). The FUSE 222B may continue working in the background as a proxy for the overlay mount 224 until the plurality of files corresponding to the container image 305 are referenced by processes in the container 115. Once there are no more files referenced in the FUSE 222B, the FUSE mount 223 is unmounted and the FUSE 222B terminates.

Figure 6:
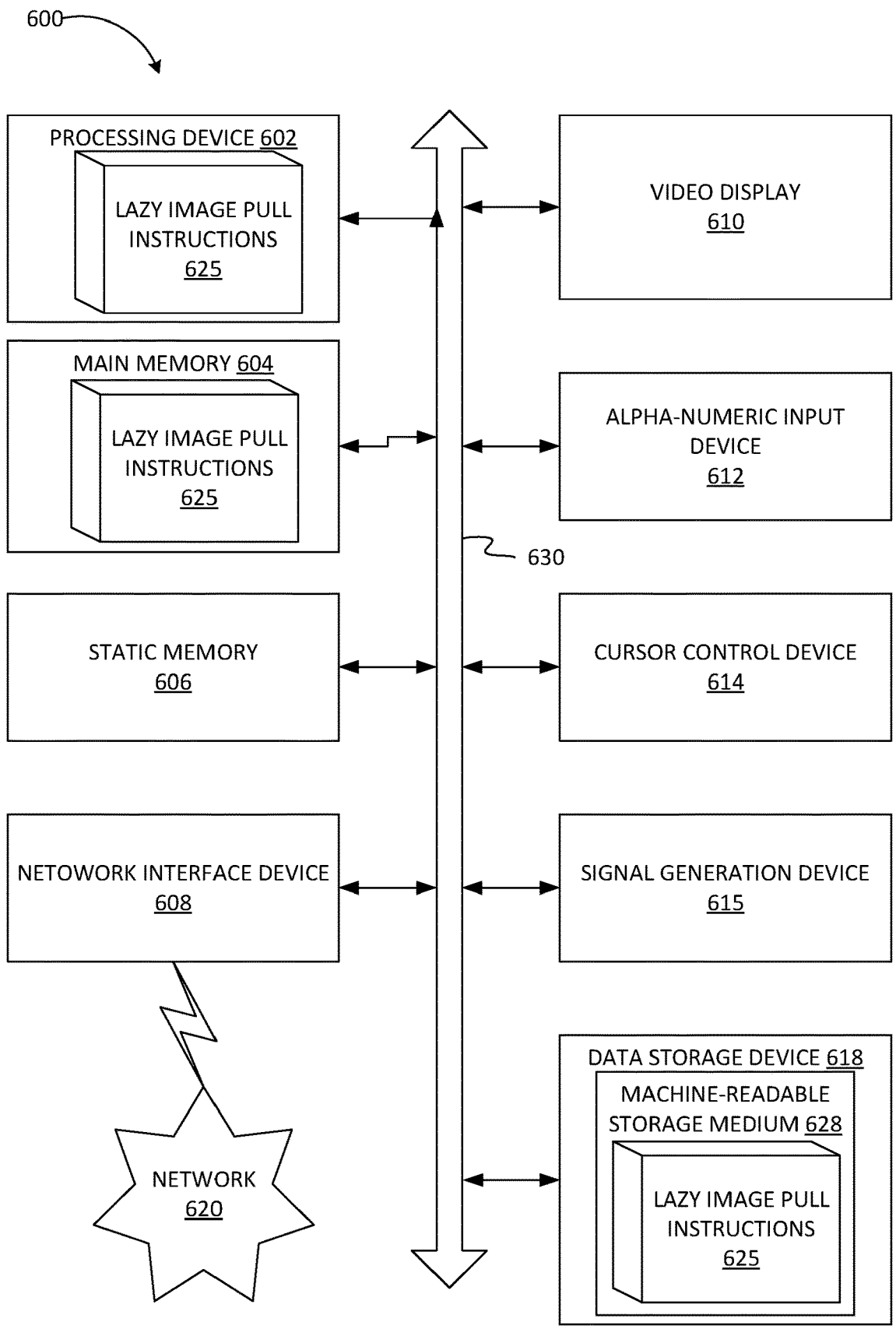
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for performing a lazy pull of a container image. In some embodiments, the machine may retrieve, by a file system in user space (FUSE), a plurality of files corresponding to a container image. The FUSE may be mounted on a FUSE mount point that overlays an empty mount point (i.e., has no directories). The FUSE mount point and the empty mount point may be combined into a single mount point by an Overlay file system (Overlay FS). The plurality of files may be used by the FUSE to build, in the empty mount point, one or more base layers for running a container. During the retrieving, the FUSE may receive from the container, one or more file requests, and may temporarily block each of the one or more file requests until it can process them. Stated differently, the FUSE may act as a proxy between the container and the container image. In response to determining that all of the plurality of files have been retrieved or requested, the FUSE may process any outstanding file requests and instruct the mount point to run the container using the one or more base layers created. The FUSE may then unmount itself, to thereby expose the container to the underlying mount point.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute lazy image pull instructions 625, for performing the operations and steps discussed herein.

The data storage device 615 may include a machine-readable storage medium 628, on which is stored one or more sets of lazy image pull instructions 625 (e.g., software) embodying any one or more of the methodologies of functions described herein. The lazy image pull instructions 625 may also reside, completely or at least partially, within the main memory 604 or within the processing device 602 during execution thereof by the computer system 600; the main memory 604 and the processing device 602 also constituting machine-readable storage media. The lazy image pull instructions 625 may further be transmitted or received over a network 620 via the network interface device 608.

While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
   retrieving, by a file system in user space (FUSE), a plurality of files corresponding to an image file to build, in a mount point implemented in an operating system kernel, one or more base layers for running a container, wherein the mount point is initially generated with a set of empty layers, and the FUSE is mounted at a FUSE mount point that is overlaid on top of the mount point as part of a second file system implemented in the operating system kernel;
   during the retrieving and while the one or more base layers are being built, receiving from the container, one or more file requests, each of the one or more file requests processed by the FUSE and wherein the FUSE acts as a proxy between the container and the image file; and
   in response to determining that all of the plurality of files have been retrieved or requested:
     processing any outstanding file requests; and
     instructing, by a processing device, the mount point to run the container using the one or more base layers built in the mount point.

2. The method of claim 1, wherein the mount point and the FUSE mount point are combined into a single mount point by the second file system implemented in the operating system kernel.

3. The method of claim 1, further comprising:
   unmounting the FUSE to expose the container to the mount point comprising the one or more base layers.

4. The method of claim 1, wherein processing a file request comprises:
   determining whether a requested file is one of the plurality of files;
   in response to determining that the requested file is one of the plurality of files, determining whether the requested file has been retrieved by the FUSE;
   in response to determining that the requested file has been retrieved by the FUSE, retrieving the requested file from the mount point and providing it to the container; and
   in response to determining that the requested file has not been retrieved by the FUSE, retrieving the requested file from a registry server, writing the requested file to the mount point, and providing the requested file to the container.

5. The method of claim 4, wherein processing a request for files further comprises:
   in response to determining that the requested file is not one of the plurality of files, creating an empty file in a write layer of the mount point.

6. The method of claim 1, wherein the FUSE retrieves the plurality of files as a background process.

7. A system comprising:
   a memory; and
   a processing device, operatively coupled to the memory, the processing device to:

retrieve, by a file system in user space (FUSE), a plurality of files corresponding to an image file to build, in a mount point implemented in an operating system kernel, one or more base layers for running a container, wherein the mount point is initially generated with a set of empty layers, and the FUSE is mounted at a FUSE mount point that is overlaid on top of the mount point as part of a second file system implemented in the operating system kernel;

during the retrieve and while the one or more base layers are being built, receive from the container, one or more file requests, each of the one or more file requests processed by the FUSE and wherein the FUSE acts as a proxy between the container and the image file; and in response to determining that all of the plurality of files have been retrieved or requested:
  process any outstanding file requests; and
  instruct the mount point to run the container using the one or more base layers built in the mount point.

8. The system of claim 7, wherein the mount point and the FUSE mount point are combined into a single mount point by the second file system implemented in the operating system kernel.

9. The system of claim 7, wherein the processing device is further to:
unmount the FUSE to expose the container to the mount point comprising the one or more base layers.

10. The system of claim 7, wherein to process a file request, the processing device is to:
determine whether a requested file is one of the plurality of files;
in response to determining that the requested file is one of the plurality of files, determine whether the requested file has been retrieved by the FUSE;
in response to determining that the requested file has been retrieved by the FUSE, retrieve the requested file from the mount point and providing it to the container; and
in response to determining that the requested file has not been retrieved by the FUSE, retrieve the requested file from a registry server, write the requested file to the mount point, and provide the requested file to the container.

11. The system of claim 10, wherein to process a request for files, the processing device is further to:
in response to determining that the requested file is not one of the plurality of files, create an empty file in a write layer of the mount point.

12. The system of claim 7, wherein the FUSE retrieves the plurality of files as a background process.

13. A non-transitory computer-readable medium having instructions stored thereon which, when executed by a processing device, cause the processing device to:

retrieve, by a file system in user space (FUSE), a plurality of files corresponding to an image file to build, in a mount point implemented in an operating system kernel, one or more base layers for running a container, wherein the mount point is initially generated with a set of empty layers, and the FUSE is mounted at a FUSE mount point that is overlaid on top of the mount point as part of a second file system implemented in the operating system kernel;

during the retrieve and while the one or more base layers are being built, receive from the container, one or more file requests, each of the one or more file requests processed by the FUSE and wherein the FUSE acts as a proxy between the container and the image file; and in response to determining that all of the plurality of files have been retrieved or requested:
  process any outstanding file requests; and
  instruct, by the processing device, the mount point to run the container using the one or more base layers built in the mount point.

14. The non-transitory computer-readable medium of claim 13, wherein the mount point and the FUSE mount point are combined into a single mount point by the second file system implemented in the operating system kernel.

15. The non-transitory computer-readable medium of claim 13, wherein the processing device is further to:
unmount the FUSE to expose the container to the mount point comprising the one or more base layers.

16. The non-transitory computer-readable medium of claim 13, wherein to process a file request, the processing device is to:
determine whether a requested file is one of the plurality of files;
in response to determining that the requested file is one of the plurality of files, determine whether the requested file has been retrieved by the FUSE;
in response to determining that the requested file has been retrieved by the FUSE, retrieve the requested file from the mount point and providing it to the container; and
in response to determining that the requested file has not been retrieved by the FUSE, retrieve the requested file from a registry server, writing the requested file to the mount point, and providing the requested file to the container.

17. The non-transitory computer-readable medium of claim 16, wherein to process a request for files, the processing device is further to:
in response to determining that the requested file is not one of the plurality of files, creating an empty file in a write layer of the mount point.

\* \* \* \* \*